US010969311B2

(12) United States Patent
Kampmann (10) Patent No.: US 10,969,311 B2
(45) Date of Patent: Apr. 6, 2021

(54) TENSILE TEST FIXTURE FOR QUICK TESTING OF MATERIALS WITH LOW TRANSVERSE STRENGTH

(71) Applicant: THE FLORIDA STATE UNIVERSITY RESEARCH FOUNDATION, INC., Tallahassee, FL (US)

(72) Inventor: Raphael Kampmann, Tallahassee, FL (US)

(73) Assignee: THE FLORIDA STATE UNIVERSITY RESEARCH FOUNDATION, Tallahassee, FL (US)

( * ) Notice: Subject to any disclaimer, the term of this patent is extended or adjusted under 35 U.S.C. 154(b) by 338 days.

(21) Appl. No.: 15/886,735

(22) Filed: Feb. 1, 2018

(65) Prior Publication Data

US 2019/0234845 A1    Aug. 1, 2019

(51) Int. Cl.
*G01N 3/02*    (2006.01)
*G01N 3/08*    (2006.01)

(52) U.S. Cl.
CPC .......... *G01N 3/02* (2013.01); *G01N 3/08* (2013.01); *G01N 2203/0017* (2013.01); *G01N 2203/0447* (2013.01)

(58) Field of Classification Search
CPC .... G01N 3/02; G01N 3/08; G01N 2203/0017; G01N 2203/0447; G01N 2203/0405; G01N 3/04
See application file for complete search history.

(56) References Cited

U.S. PATENT DOCUMENTS

| 3,938,373 | A |   | 2/1976 | Fletcher et al. |
| 4,251,918 | A | * | 2/1981 | Duggan ............ G01B 7/18 33/790 |
| 5,431,060 | A | * | 7/1995 | Lauren ............. G01N 3/08 374/49 |
| 7,770,467 | B1 | * | 8/2010 | Halderman ........ G01N 3/04 73/849 |
| 7,793,553 | B2 |   | 9/2010 | Lindeman |
| 2002/0166387 | A1 |   | 11/2002 | Grote et al. |

FOREIGN PATENT DOCUMENTS

| CN | 206057081 | 3/2017 |
| CN | 106769423 | 5/2017 |
| CN | 206671062 | 11/2017 |

OTHER PUBLICATIONS

English translation of prior art document to Fang et al. CN 206057081 (Year: 2016).*

(Continued)

*Primary Examiner* — Herbert K Roberts
*Assistant Examiner* — John M Royston
(74) *Attorney, Agent, or Firm* — FisherBroyles LLP; Anthony J DoVale (57) ABSTRACT

A tensile test fixture for quick testing of materials with low transverse strength and relatively high longitudinal strength. After the tensile test fixture is loaded into a universal testing machine, such as a two-part load frame, a first test specimen is aligned and tensile tested. Alignment of the first test specimen ensures that all consecutive test specimens are aligned within the tensile test fixture without further alignment required.

10 Claims, 5 Drawing Sheets

(56) References Cited

OTHER PUBLICATIONS

English translation of prior art document to Hou et al. CN 106769423 (Year: 2016).*
English translation of prior art document to Cen et al. CN 206671062 (Year: 2017).*
English translation of Chen et al. CN 108225927 (Year: 2017).*
International Search Report and Written Opinion issued for International Application No. PCT/US19/012837 dated Mar. 18, 2019.

* cited by examiner

TENSILE TEST FIXTURE FOR QUICK TESTING OF MATERIALS WITH LOW TRANSVERSE STRENGTH

TECHNICAL FIELD

The present disclosure generally relates to methods and devices for testing the tensile strength of composite materials, and more particularly, to a fixture for quickly and easily testing the tensile strength of materials with low transverse strength and relatively high axial strength.

BACKGROUND

Tensile testing, also known as tension testing, is a fundamental materials science test in which a sample is subjected to a controlled tensile load until failure. The results from the test are commonly used to select a material for an application, for quality control, or to predict how a material will react under normal forces. Tensile testing measures ultimate tensile strength, maximum elongation, and reduction in area.

Fiber reinforced composite (FRP) materials such as carbon fiber reinforced polymers (CFRP) bars, glass fiber reinforced polymer (GFRP) bars, basalt fiber reinforced polymer (BFRP) bars, and the like are strong, lightweight materials that contain two parts: (1) a matrix and (2) a reinforcement. The reinforcement is the fiber, whether it is carbon, glass, or basalt, and provides the strength to the FRP, while the matrix binds the reinforcement together. These FRP materials have an extremely high tensile strength in the direction of the fibers, but may be weak in a transverse direction across the fibers.

Metallic materials may be tensile tested with traditional grips, but it is difficult to tensile test FRP materials because the FRP materials cannot be clamped directly with traditional grips and the fibers may be crushed. Instead, these materials have to be encased by anchors at the specimen ends to protect the tested material from being crushed in the weak transverse direction. Aligning the anchors can be difficult and time-consuming, and each specimen requires a dedicated setup procedure for each test run.

Therefore, an improved method and device for tensile testing of FRP composite materials with low transverse strength and relatively high axial strength is desired.

BRIEF SUMMARY

Disclosed herein is a tensile test fixture for quick testing of materials with low transverse strength. The tensile test fixture may comprise an upper fixture and a lower fixture. Each fixture may comprise a bearing plate, a T-plate, a lock plate, and an anchor. The bearing plate may comprise a slot extending from an edge of the bearing plate to the center of the bearing plate. The lock plate may be mounted to a surface of the bearing plate and may comprise an aperture defined therethrough. The anchor may be mounted to a surface of the lock plate opposite the bearing plate. The bearing plate and the T-plate may be spaced apart from each other by one or more threaded rods. The upper fixture and the lower fixture may be oriented in opposite directions about a centerline, with the bearing plates of the upper fixture and the lower fixture proximate the centerline and the T-plates of the upper fixture and the lower fixture distal the centerline. A test specimen may be operable to be received through central apertures defined by the slots in the bearing plates and the apertures in the lock plates of the upper fixture and lower fixture. The lock plate and the anchor may be operable to align and then lock the test specimen within the tensile test fixture during tensile testing. The tensile test fixture is operable to be loaded into a universal testing machine, such as a two-part load frame, for tensile testing the test specimen. Advantageously, alignment of a first test specimen ensures that all consecutive test specimens are aligned within the tensile test fixture without further alignment required.

BRIEF DESCRIPTION OF THE DRAWINGS

Embodiments are illustrated by way of example in the accompanying figures, in which like reference numbers indicate similar parts, and in which.

DETAILED DESCRIPTION

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

To facilitate the understanding of this disclosure, a number of anatomic terms are defined below. Terms defined herein have meanings as commonly understood by a person of ordinary skill in the areas relevant to the present disclosure. Terms such as "a", "an", and "the" are not intended to refer to only a singular entity, but include the general class of which a specific example may be used for illustration. The terminology herein is used to describe specific embodiments of the disclosure, but their usage does not limit the disclosure, except as outlined in the claims.

Various embodiments of a tensile text fixture are described. It is to be understood, however, that the following explanation is merely exemplary in describing the devices and methods of the present disclosure. Accordingly, several modifications, changes, and substitutions are contemplated.

Figure 1:
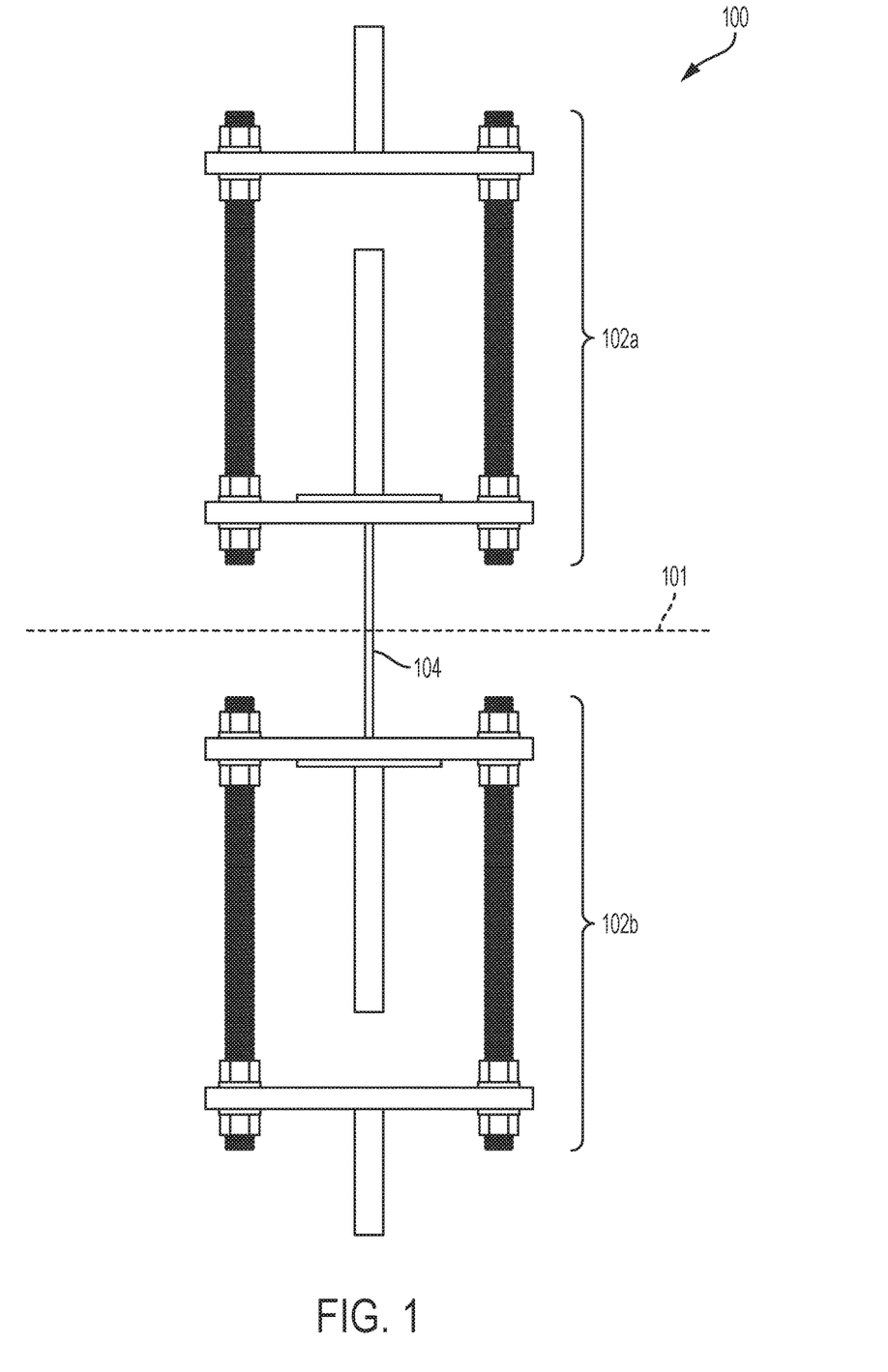
FIG. 1 illustrates an orthogonal view of a tensile test fixture, in accordance with one embodiment of the present disclosure.
Figure 2:
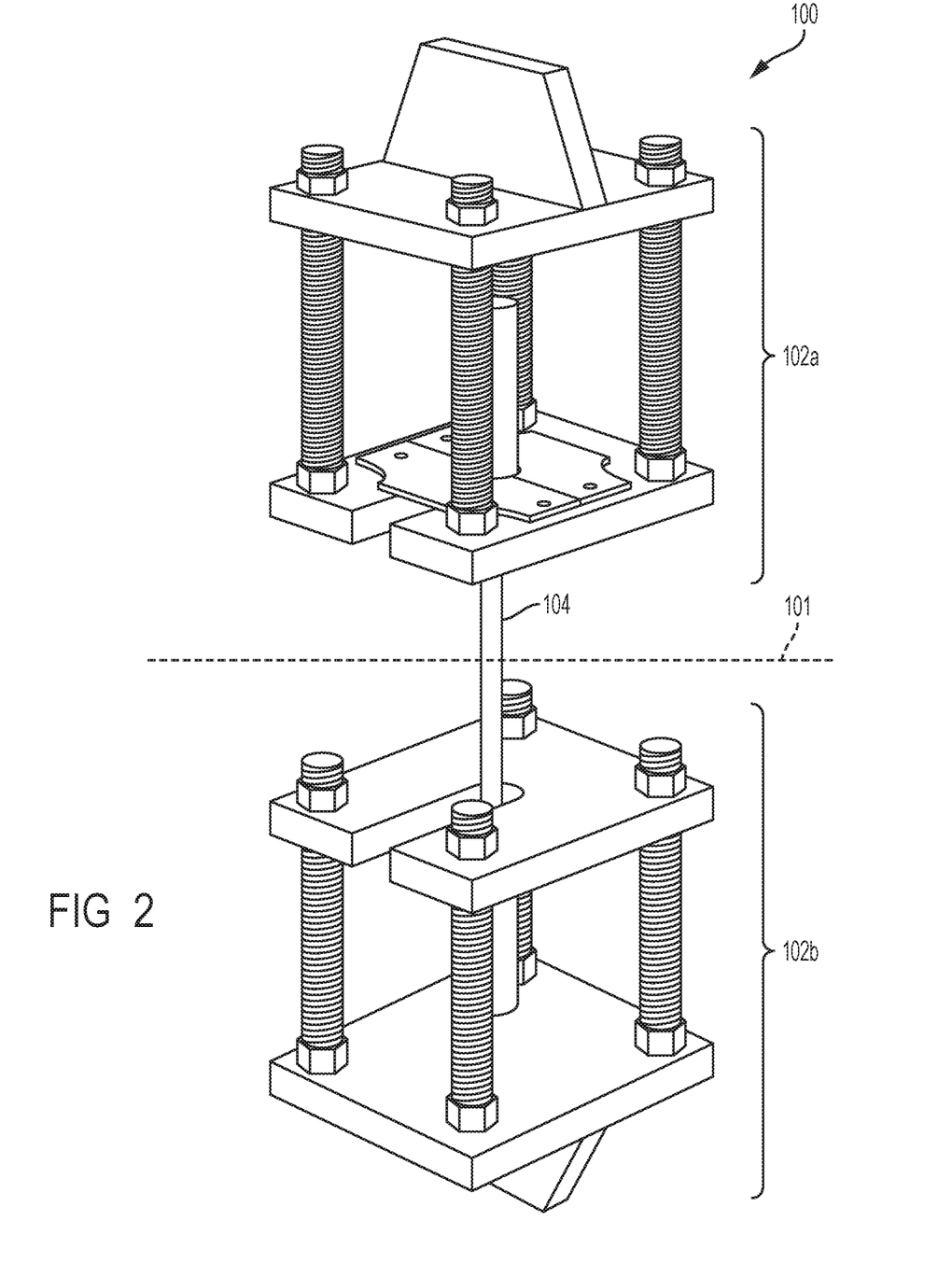
FIG. 2 illustrates a perspective view of the tensile test fixture of FIG. 1, in accordance with one embodiment of the present disclosure.

FIG. 1 illustrates an orthogonal view and FIG. 2 illustrates a perspective view of a tensile test fixture 100, in accordance with one embodiment of the present disclosure. The tensile test fixture 100 may comprise an upper fixture 102a and a lower fixture 102b which are operable to hold a FRP rebar specimen 104 therebetween during tensile testing. The tensile test fixture 100 may be mounted in a known load frame (not shown) during quick testing of materials with low transverse but high longitudinal strength.

The components of the tensile test fixture 100 will be discussed in more detail in relation to FIGS. 3-6 below. In an embodiment, the upper fixture 102a of FIG. 3 and the lower fixture 102b of FIG. 4 may be identical to each other with the two fixtures orientated such that like components are equidistant between a centerline 101 between the two fixtures when the tensile test fixture 100 is mounted in a load frame. As discussed herein, when referring to the orientation of components of the upper fixture 102a and the lower fixture 102b, "proximate" means closer to the centerline 101 while "distal" means away from the centerline 101.

In an embodiment, the tensile test fixture 100 may be a 500 kN load frame. In order to make sure that the FRP rebar specimen 104 fails and not the tensile test fixture 100, the fixture 100 must be strong enough to match the maximum force of the load frame (i.e., 500 kN). Accordingly, each of the components of the upper and lower fixtures 102a, 102b discussed below, including the bearing plates, the T-plates, and the threaded rods must be strong enough to accommodate a force of 500 kN.

Figure 3:
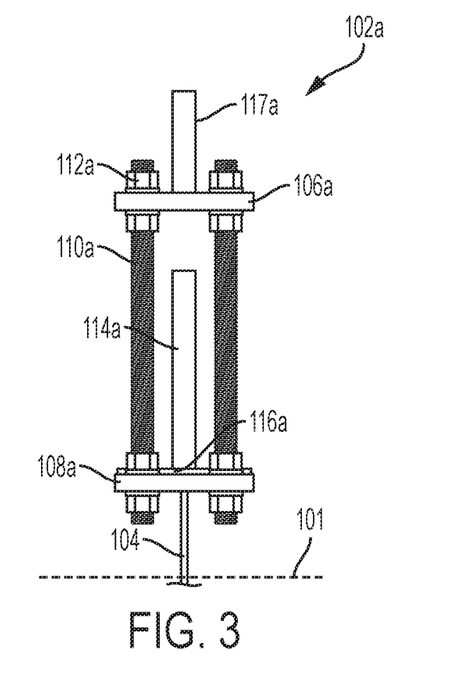
FIG. 3 illustrates an orthogonal view of the upper fixture of the tensile test fixture of FIG. 1, in accordance with one embodiment of the present disclosure.

FIG. 3 illustrates an orthogonal view of the upper fixture 102a of the tensile test fixture 100 of FIG. 1, in accordance with one embodiment of the present disclosure. The upper fixture 102a may comprise a bearing plate 108a proximate to the centerline 101 and a T-plate 106a distal (away from) to the centerline. The bearing plate 108a may be operable to receive the specimen 104 therethrough, while the T-plate 106a is spaced apart from the specimen 104. The bearing plate 108a and the T-plate 106a may be separated apart from each other by one or more threaded rods 110a.

The threaded rods 110a may be threaded through apertures in the bearing plate 108a and the T-plate 106a and may be used to space the bearing plate 108a and the T-plate 106a a desired distance apart from each other. In an embodiment, four threaded rods 110a may be disposed between the bearing plate 108a and the T-plate 106a, although in other embodiments, two, three, four, five, six, or more threaded rods 110a may separate the two.

Each threaded rod 110a may be secured in place to the bearing plate 108a with a flange nut 112a on the top and a flange nut 112a on the bottom of the bearing plate 108a, and each threaded rod 110a may be secured in place to the T-plate 106a with a flange nut 112a on the top and a flange nut 112a on the bottom of the T-plate 106a.

A lock plate 116a may be mounted on a surface of the bearing plate 108a distal from the centerline 101. The lock plate 116a may be a two-part plate connected to the bearing plate 108a with a plurality of cross recess screws (not shown). Each half of the two-part lock plate 116a may comprise half of a central aperture (not shown), such that the lock plate 116a may be received around the specimen 104 disposed through an aperture (not shown) in the bearing plate 108a when the lock plate 116a is secured to the bearing plate 108a. In an embodiment, the lock plate 116a may be sized and shaped to mount onto the bearing plate 108a around the threaded rods 110a.

In operation, an anchor 114a is glued to the FRP rebar specimen 104 with a grout or an epoxy before the specimen 104 may be mounted into the tensile test fixture 100. In an embodiment, the anchor 114a may be a metal tube operable to be placed around the specimen 104. The space between the anchor 114a and the specimen 104 may be filled with an expansive grout or epoxy, which creates friction between the specimen 104 and the anchor 114a. During testing, the anchor 114a can be "grapped" to pull the specimen 104 apart. In order for the glued anchor 114a and specimen 104 to be strong enough for testing, the anchor 114a may have to be glued at least one week before testing.

Once the anchor 114a has been properly glued to the specimen 104 and on the day of testing, the specimen 104 may be operable to be received from a direction of the centerline 101 through the aperture in the bearing plate 108a, and then the locking plate 116a is secured around the specimen 104 and connected to the bearing plate 108a. Once received, the anchor 114a may be positioned between the bearing plate 108a and the T-plate 106a, proximate to the lock plate 116a and between the threaded rods 110a, thereby securing and aligning the specimen 104 within the upper fixture 102a.

The upper fixture 102a may further comprise a connection means 117a extending distally beyond the T-plate 106a and operable to provide an area for grips from a universal testing machine (not shown) to grip onto the upper fixture 102a for mounting and tensile testing. In an embodiment, the connection means 117a may be a plate that is welled (filled weld) to an upper surface of the T-plate 106a.

Figure 4:
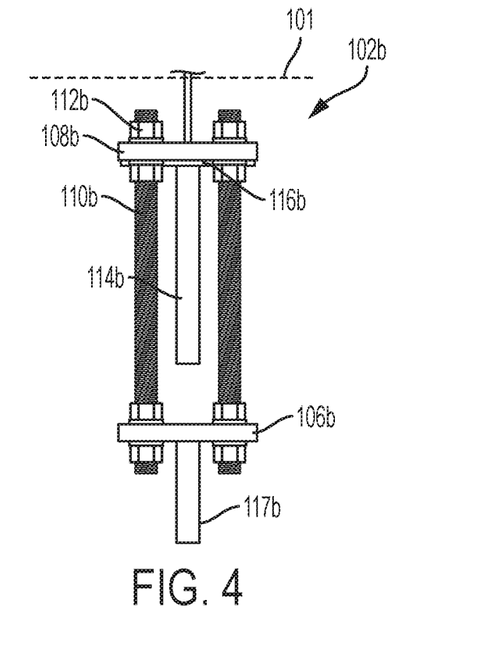
FIG. 4 illustrates an orthogonal view of the lower fixture of the tensile test fixture of FIG. 1, in accordance with one embodiment of the present disclosure.

FIG. 4 illustrates an orthogonal view of the lower fixture 102b of the tensile test fixture 100 of FIG. 1, in accordance with one embodiment of the present disclosure. The upper fixture 102b may comprise a bearing plate 108b proximate to the centerline 101 and a T-plate 106b distal (away from) to the centerline. The bearing plate 108b may be operable to receive the specimen 104 therethrough, while the T-plate 106b is spaced apart from the specimen 104. The bearing plate 108b and the T-plate 106b may be separated apart from each other by one or more threaded rods 110b.

The threaded rods 110b may be threaded through apertures in the bearing plate 108b and the T-plate 106b and may be used to space the bearing plate 108b and the T-plate 106b a desired distance apart from each other. In an embodiment, four threaded rods 110b may be disposed between the bearing plate 108b and the T-plate 106b, although in other embodiments, two, three, four, five, six, or more threaded rods 110b may separate the two.

Each threaded rod 110b may be secured in place to the bearing plate 108b with a flange nut 112b on the top and a flange nut 112b on the bottom of the bearing plate 108b, and each threaded rod 110b may be secured in place to the T-plate 106b with a flange nut 112b on the top and a flange nut 112b on the bottom of the T-plate 106b.

A lock plate 116b may mounted on a surface of the bearing plate 108b distal from the centerline 101. The lock plate 116b may be a two-part plate connected to the bearing plate 108b with a plurality of cross recess screws (not shown). Each half of the two-part lock plate 116b may comprise half of a central aperture (not shown), such that the lock plate 116b may be received around the specimen 104 disposed through an aperture (not shown) in the bearing plate 108b when the lock plate 116b is secured to the bearing plate 108b. In an embodiment, the lock plate 116b may be sized and shaped to mount onto the bearing plate 108b around the threaded rods 110b.

In operation, an anchor 114b is glued to the FRP rebar specimen 104 with a grout or an epoxy before the specimen 104 may be mounted into the tensile test fixture 100. In an embodiment, the anchor 114b may be a metal tube operable to be placed around the specimen 104. The space between the anchor 114b and the specimen 104 may be filled with an expansive grout or epoxy, which creates friction between the specimen 104 and the anchor 114b. During testing, the anchor 114b can be "grapped" to pull the specimen 104 apart. In order for the glued anchor 114b and specimen 104 to be strong enough for testing, the anchor 114b may have to be glued at least one week before testing.

Once the anchor 114b has been properly glued to the specimen 104 and on the day of testing, the specimen 104 may be operable to be received from a direction of the centerline 101 through the aperture in the bearing plate 108b, and then the locking plate 116b is secured around the specimen 104 and connected to the bearing plate 108b. Once received, the anchor 114b may be positioned between the bearing plate 108b and the T-plate 106b proximate to the lock plate 116b and between the threaded rods 110b, thereby securing and aligning the specimen 104 within the lower fixture 102b.

The lower fixture 102b may further comprise a connection means 117b extending distally beyond the T-plate 106b and operable to provide an area for grips from a universal testing machine (not shown) to grip onto the lower fixture 102b for mounting and tensile testing. In an embodiment, the connection means 117b may be a plate that is welled (filled weld) to a lower surface of the T-plate 106b.

Figure 5:
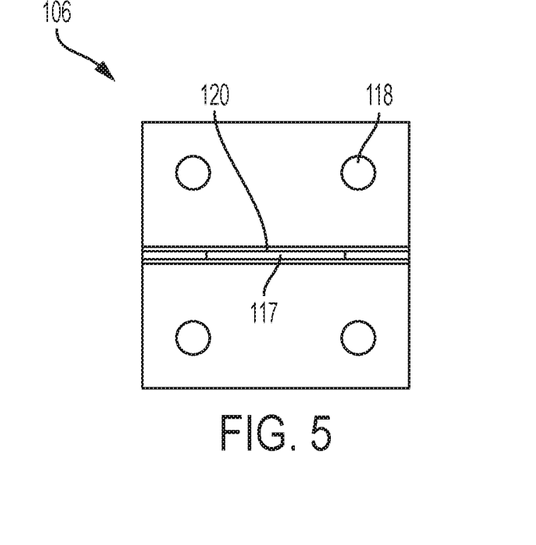
FIG. 5 illustrates an orthogonal top view of the T-plate of the tensile test fixture of FIG. 1, in accordance with one embodiment of the present disclosure.

FIG. 5 illustrates an orthogonal top view of one of the T-plates 106 of the tensile test fixture 100 of FIG. 1, in accordance with one embodiment of the present disclosure. The T-plate 106 of FIG. 5 may be either or both the T-plate 106a of the upper fixture 102a and the T-plate 106b of the lower fixture 102b.

The T-plate 106 may be generally square and include one or more threaded apertures 118 operable to receive the threaded rods 110 (not shown) therethrough. As shown in FIG. 5, four threaded apertures 118 may be placed in a square pattern proximate each of the four corners of the T-plate 106.

The T-plate 106 may further include an opening and a filled weld 120 which connects the connection means 117 to the T-plate 106. In an embodiment, and for the dimensions discussed in FIGS. 8 and 9 below, the filled weld 120 may need to be a fully filled weld for strength purposes (i.e., 500 kN in a 500 kN load frame). The filled weld 120 may ensure that the connection between the T-plate 106 and the connection means 117 is not the weak point of the tensile test fixture 100 and that the tested specimen (not shown) is weaker than the assembly, ensuring that failure occurs within the specimen. Whether a filled weld 120 is necessary is dependent on the maximum load capacity of the tensile test fixture 100.

Figure 6:
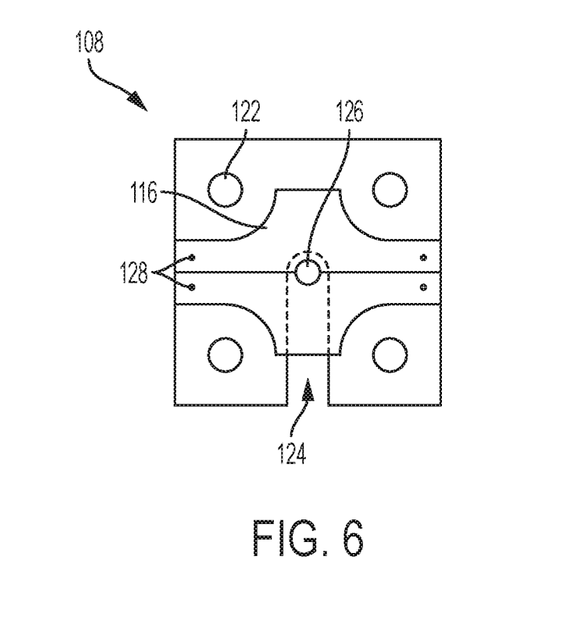
FIG. 6 illustrates an orthogonal top view of the bearing plate of the tensile test fixture of FIG. 1, in accordance with one embodiment of the present disclosure.

FIG. 6 illustrates an orthogonal top view of one of the bearing plates 108 of the tensile test fixture 100 of FIG. 1, in accordance with one embodiment of the present disclosure. The bearing plate 108 of FIG. 6 may be both the bearing plate 108a of the upper fixture 102a and the bearing plate 108b of the lower fixture 102b.

The bearing plate 108 may be generally square and include one or more threaded apertures 122 operable to receive the threaded rods 110 (not shown) therethrough. As shown in FIG. 6, four threaded apertures 122 may be placed in a square pattern proximate each of the four corners of the bearing plate 108 and may align with the threaded apertures 118 of the T-plate 106 in FIG. 5.

The bearing plate 108 may further include a slot 124 extending from one edge to the center of the bearing plate 108. The slot 124 may be sized and shaped to receive the specimen 104 from the front edge when the tensile test fixture 100 is mounted in a load frame. As discussed above in relation to FIGS. 3 and 4, the lock plate 116 may be a two-part lock plate 116 where each half of the lock plate 116 spans across the slot 124 such that the slot 124 is perpendicular to the edges of the two-part lock plate 116 that abut each other when the specimen is received through a central aperture 126 of the lock plate 116 and the lock plate 116 is secured to the bearing plate with one or more head screws 128.

The central aperture 126 may be circular to accommodate traditional FRP bars, but the locking plate 116 may define a central aperture 126 for any size and shape, such as round, square, rectangular, oval, Y-shaped, etc. for non-traditional FRP bars.

Figure 7:
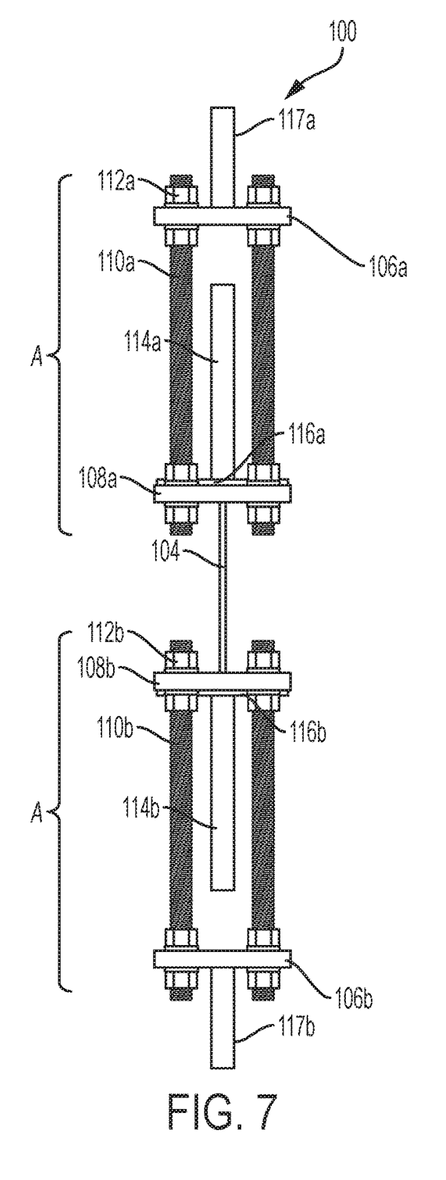
FIG. 7 illustrates an orthogonal view of a tensile test fixture, in accordance with one embodiment of the present disclosure.
Figure 8:
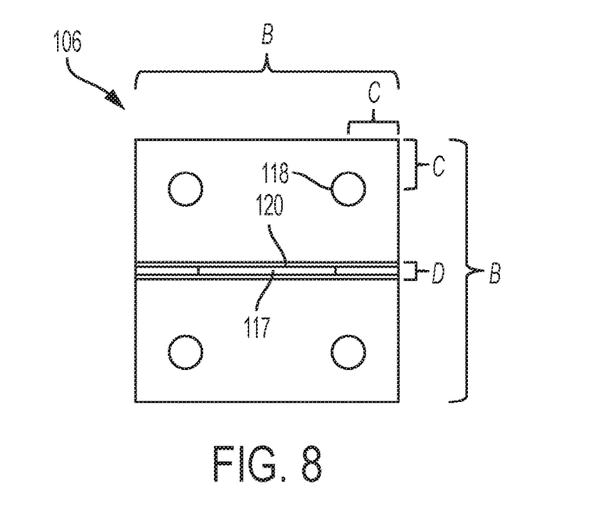
FIG. 8 illustrates an orthogonal top view of a T-plate of the tensile test fixture of FIG. 7, in accordance with one embodiment of the present disclosure.
Figure 9:
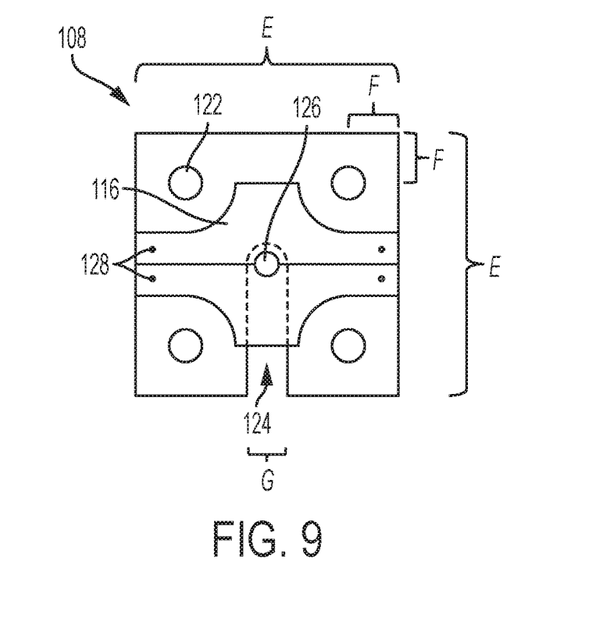
FIG. 9 illustrates an orthogonal top view of a bearing plate of the tensile test fixture of FIG. 7, in accordance with one embodiment of the present disclosure.

FIGS. 7-9 below discuss materials and dimensions for one embodiment of the tensile test fixture 100 of the present disclosure. Other materials and/or dimensions may be ascertainable to those skilled in the art.

FIG. 7 illustrates an orthogonal view of a tensile test fixture 100, in accordance with one embodiment of the present disclosure. In an embodiment, the threaded rods 110 may have a length A of approximately 22", thereby allowing the T-plate 106 and the bearing plate 108 to be spaced apart from each other up to approximately 20", allowing approximately an inch on each end for a flange nut 112.

FIG. 8 illustrates an orthogonal top view of a T-plate 106 of the tensile test fixture 110 of FIG. 7, in accordance with one embodiment of the present disclosure. In an embodiment, the T-plate 106 may be a square plate B×B of approximately 8"×8" with the center of each aperture 118 a length C approximately 1.5" from two edges of the T-plate 106 at each corner. The filled weld 120 may run the length of the T-plate 106 in the same direction as the abutting edges of the lock plate 116 described in FIG. 9 below, with a gap D of approximately 0.4".

FIG. 9 illustrates an orthogonal top view of a bearing plate 108 of the tensile test fixture 100 of FIG. 7, in accordance with one embodiment of the present disclosure. In an embodiment, the bearing plate 108 may a square plate E×E of approximately 8"×8" with the center of each aperture 122 a length F approximately 1.5" from two edges of the bearing plate 108 at each corner. The slot 124 may be a width G of approximately 1.5" wide and may extend from an edge of the bearing plate 108 beyond the center, thereby creating the aperture 126 with the lock plate 116 for the specimen 104 to be received therethrough.

In an embodiment, each component discussed above may be manufactured from steel. The threaded rods 110 may be manufactured from low elastic modulus steel, and the T-plates 106 and bearing plates 108 may be manufactured from hardened steel with a Rockwell hardness C-HRC.

Figure 10:
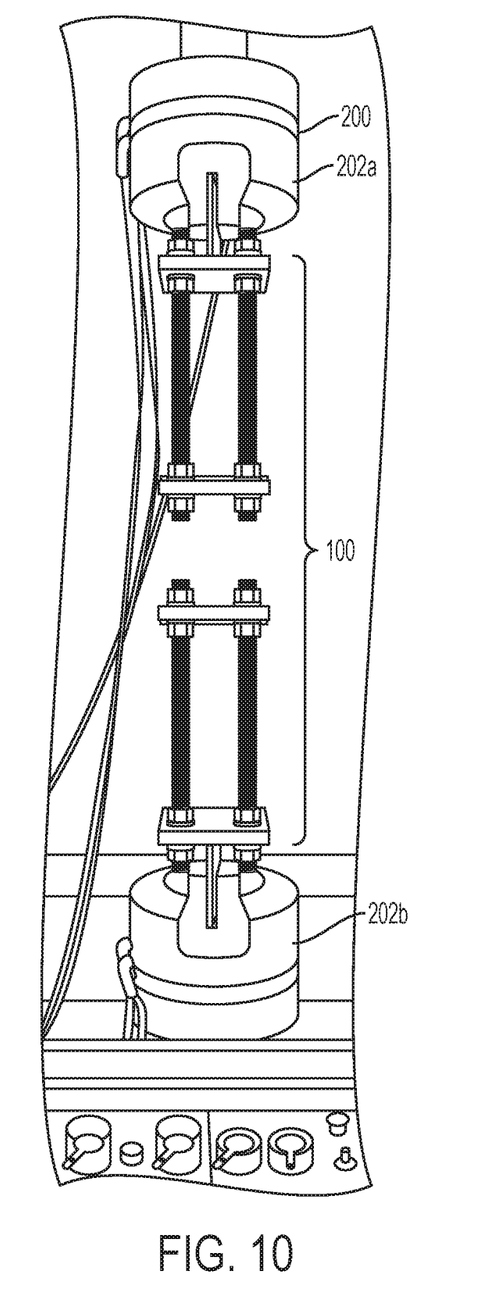
FIG. 10 illustrates an orthogonal view of a tensile text fixture mounted in a load frame without a test specimen, in accordance with one embodiment of the present disclosure.
Figure 11:
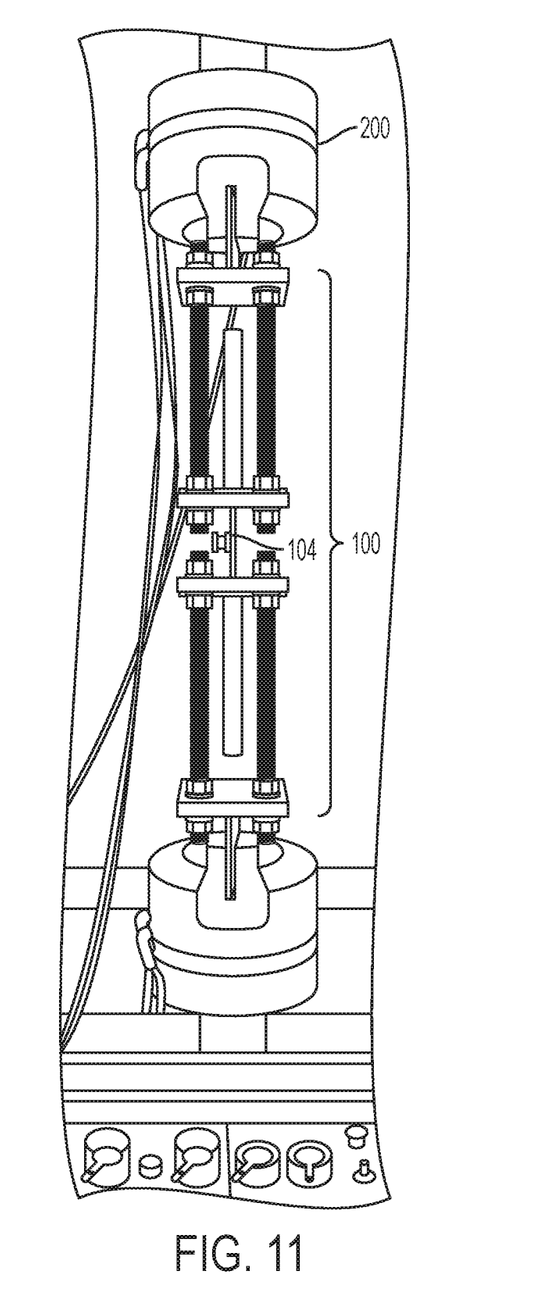
FIG. 11 illustrates an orthogonal view of the tensile test fixture of FIG. 10 mounted in the load frame with a test specimen, in accordance with one embodiment of the present disclosure.

FIG. 10 illustrates an orthogonal view of a tensile text fixture 100 mounted in a load frame 200 without a test specimen and FIG. 11 illustrates an orthogonal view of the tensile test fixture 100 mounted in the load frame 200 with a test specimen 104, in accordance with one embodiment of the present disclosure.

The tensile test fixture 100 may be mounted in a known universal testing machine such as a two-part load frame 200 and the upper fixture 102a and the lower fixture 102b may be spaced apart from each other a desired distance within the load frame 200. The universal testing machine may have two crossbars 202a, 202b—one is adjusted for the length of the specimen 104 and the other is driven to apply tension to the specimen 104.

The load frame 200 must have the proper capabilities for the test specimen 104 being tested. There are four main parameters: force capacity, speed, precision, and accuracy. Force capacity refers to the fact that the load frame 200 must be able to generate enough force to fracture the specimen 104. The load frame 200 must be able to apply the force quickly or slowly enough to properly mimic the actual application. Finally, the load frame 200 must be able to accurately and precisely measure the gauge length and forces applied.

Alignment of the test specimen 104 in the load frame 200 is critical, because if the specimen 104 is misaligned, either at an angle or offset to one side, the load frame 200 may exert bending stresses on the specimen 104, which is especially bad for brittle materials such as FRPs, because it will dramatically skew the test results.

In operation, after the anchors 114 are glued to the specimen 104 and set aside for at least a week, the test process involves placing the test specimen 104 in the tensile test fixture 100 and slowly extending it with the load frame 200 until it fractures. During this process, the elongation of the gauge section is recorded against the applied force.

More specifically, in an embodiment and in operation, the lower T-plate 106b of the fixture 100 may be clamped with a pressure of approximate 30 MPa (4.35 ksi) into the lower grips of the load frame 200 by using a level to ensure a proper alignment. Subsequently, the upper T-plate 106a may be placed on top of the lower T-plate 106b before clamping it with the upper grips of the load frame 200. This helps to ensure that both T-plates 106a, 106b are aligned and that the holes in both T-plates 106a, 106b are positioned precisely one above each other. After also clamping the upper T-plate 106a with a pressure of approximately 30 MPa (4.35 ksi), the upper fixture 102a and the crossbar 202a of the load frame 200 may be moved into a higher position to enable the installation of the threaded rods 110a onto the upper T-plate 106a. Once the threaded rods 110a are fixed with the nuts 112a onto the T-plate 106a, the upper bearing plate 108a may be installed and also fixed by nuts 112a. A level may be used to achieve a horizontal alignment of the upper bearing plate 108a. Next, the crossbar 202a with the completed upper fixture 102a of the tensile test fixture 100 may be moved into its highest possible position, in order to achieve enough work space to complete setup of the lower fixture 102b.

Next, the lower four threaded rods 110b may be fixed to the lower T-plate 106b with the nuts 112b, and then the lower bearing plate 108b may be mounted onto the threaded rods 110b by using a level to check its horizontal alignment. Depending on the diameter of the specimen 104 to be tested, locking plates 116a, 116b with a hole for either #3 or #5 FRP may be connected to the respective bearing plates 108a, 108b and used to hold the specimen 104 in position. After the specimen 104 is placed into the tensile test fixture 100 and properly aligned by the locking plates 116a, 116b, the crossbar 202b of the load frame 200 may be locked. Subsequently, a load of 1 kN may be applied to the specimen 104 via the load frame 200 for initial testing. Finally, the actual tensile testing of the specimen 104 may begin, where the test specimen 104 is slowly extending until it fractures. During this process, the elongation of the gauge section is recorded against the applied force.

The disclosed tensile test fixture 100 advantageously ensures that only one test specimen 104 has to be aligned during each test session, and then all following, consecutive specimens 104 can be slid quickly and easily into place within the tensile test fixture 100. As such, the time required to tensile test multiple specimens 104 is greatly reduced, and specimens 104 to be tested can be exchanged in less than one minute on average with each specimen 104 being properly aligned based on the first alignment. In addition, the disclosed tensile test fixture 100 can advantageously be used for tension testing of any material and is not limited to testing FRP bars.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A tensile test fixture for testing materials with low transverse strength, the test fixture comprising:
    an upper fixture and a lower fixture, each fixture comprising:
        a bearing plate comprising a slot extending from an edge of the bearing plate to the center of the bearing plate and a T-plate, wherein the bearing plate and the T-plate are spaced apart from each other by one or more threaded rods; and
        a lock plate mounted to a surface of the bearing plate and comprising an aperture defined therethrough;
    wherein the upper fixture and the lower fixture are oriented in opposite directions about a centerline, with the bearing plates of the upper fixture and the lower fixture proximate the centerline and the T-plates of the upper fixture and the lower fixture distal the centerline;
    wherein a test specimen comprising an anchor at each end is operable to be received through central apertures defined by the slots in the bearing plates and the apertures in the lock plates of the upper fixture and lower fixture; and
    wherein the lock plates are operable to align and then lock the test specimen within the tensile test fixture for tensile testing.

2. The tensile test fixture of claim 1, wherein the tensile test fixture is operable to be loaded into a universal testing machine for tensile testing the test specimen.

3. The tensile test fixture of claim 2, wherein the universal testing machine is a two-part load frame.

4. The tensile test fixture of claim 1, wherein the bearing plates and the T-plates of the upper and lower fixture each comprise one or more threaded apertures operable to receive a corresponding number of the threaded rods, and wherein the threaded rods can be rotated to adjust the distance between the bearing plates and the T-plates.

5. The tensile test fixture of claim 4, wherein the bearing plates and the T-plates of the upper and lower fixture are each square-shaped and each comprise four threaded apertures located proximate to the corners of the plates.

6. The tensile test fixture of claim 1, wherein the lock plate is a two-part plate and each half of the two-part lock plate comprises half of the lock plate aperture, and wherein the lock plate is operable to be received around the test specimen.

7. The tensile test fixture of claim 6, wherein the lock plate is mounted on the distal surface of the bearing plates of the upper fixture and the lower fixture.

8. The tensile test fixture of claim 6, wherein the aperture of the lock plate is operable to correspond to the size and the shape of the test specimen.

9. The tensile test fixture of claim 8, wherein the aperture of the lock plate is round.

10. The tensile test fixture of claim 1, wherein alignment of a first test specimen ensures that all consecutive test specimens are aligned without alignment.

* * * * *